United States Patent
Arnold

(10) Patent No.: US 8,493,554 B2
(45) Date of Patent: Jul. 23, 2013

(54) STRUCTURAL ELEMENT FOR A FUSELAGE CELL STRUCTURE OF AN AIRCRAFT, COMPRISING AT LEAST ONE POSITIONING AID

(75) Inventor: Ralph Arnold, Oldenburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/112,527

(22) Filed: May 20, 2011

(65) Prior Publication Data
US 2011/0279809 A1    Nov. 17, 2011

Related U.S. Application Data

(63) Continuation of application No. PCT/EP2009/065001, filed on Nov. 11, 2009.

(60) Provisional application No. 61/116,807, filed on Nov. 21, 2008.

(30) Foreign Application Priority Data

Nov. 21, 2008 (DE) .......................... 10 2008 043 977

(51) Int. Cl.
*G01C 3/08* (2006.01)
(52) U.S. Cl.
USPC .......... 356/4.01; 356/3.01; 356/4.1; 356/5.01
(58) Field of Classification Search
USPC ............................................. 356/3.01–28.5
See application file for complete search history.

(56) References Cited

U.S. PATENT DOCUMENTS

| | | | |
|---|---|---|---|
| 2002/0171821 | A1 * | 11/2002 | Cloud et al. ................. 356/4.01 |
| 2008/0223985 | A1 * | 9/2008 | Marsh et al. ................. 244/119 |

FOREIGN PATENT DOCUMENTS

| | | |
|---|---|---|
| DE | 10 2004 056 286 | 5/2006 |
| DE | 10 2006 019917 A1 | 11/2007 |
| DE | 10 2008 041 190 | 3/2010 |
| EP | 0 957 335 A2 | 11/1999 |
| EP | 2 112 463 A1 | 10/2009 |

OTHER PUBLICATIONS

International Search Report for PCT Application No. PCT/EP2009/065001 dated Apr. 15, 2010.
German Office Action for Application No. DE 10 2008 043 977.0 dated Nov. 14, 2012.

* cited by examiner

*Primary Examiner* — Luke Ratcliffe
(74) *Attorney, Agent, or Firm* — Jenkins, Wilson, Taylor & Hunt, P.A.

(57) ABSTRACT

A structural element for a fuselage cell structure of an aircraft, in particular a stringer profile or an annular former segment, the structural element being made from a composite material, in particular from a carbon-fiber-reinforced epoxy resin. The structural element comprises at least one positioning aid for facilitating position determination by means of a measuring system. A laser measuring system and/or a tactile measuring system may be used as a measuring system. As a result of the reflector which can be attached to the positioning aid without clearance as a target for the laser measuring system, which is preferably a laser tracker, a spatial position of the structural element in relation to a further component can be determined very precisely and without contact. Following position determination and orientation of the structural element, the reflector can be removed from the positioning aid.

22 Claims, 2 Drawing Sheets

STRUCTURAL ELEMENT FOR A FUSELAGE CELL STRUCTURE OF AN AIRCRAFT, COMPRISING AT LEAST ONE POSITIONING AID

CROSS-REFERENCE TO RELATED APPLICATIONS

This application is a continuation of and claims priority to PCT International Application No. PCT/EP2009/065001 filed Nov. 11, 2009, which claims the benefit of and priority to U.S. Provisional Application No. 61/116,807, filed Nov. 21, 2008 and German Patent Application No. 10 2008 043 977.0, filed Nov. 21, 2008, the entire disclosures of which are herein incorporated by reference.

FIELD OF THE INVENTION

The invention relates to a structural element for a fuselage cell structure of an aircraft, in particular a stringer profile or an annular former segment, the structural element being made from a composite material, in particular from a carbon-fibre-reinforced epoxy resin.

In modern aircraft construction, efforts are being made to make greater use of composite components, the composite components preferably being produced using carbon-fibre-reinforced epoxy resins. However, the production of composite components of this type is associated with dimensional deviations which are usually unavoidable for production-related reasons and also cannot be reproduced. Fuselage sections made from composite materials are often formed by joining together at least two shell components in so-called multi-shell construction. To produce a complete aircraft fuselage cell, a plurality of fuselage sections are then joined together to form a complete aircraft fuselage cell, with transverse seams being produced.

The shell components themselves are formed, inter alia, by skin panels which are curved at least one-dimensionally and are reinforced by former segments extending transverse to the longitudinal axis of the aircraft and by further structural elements, in particular stringers. Owing to the above-mentioned unavoidable tolerance deviations during the production of CFRP components, the stringers must, for example, be measured very precisely prior to being joined to the skin panel in subsequent process steps and then positioned and orientated on the skin panel. As a result, the production of shell components involves considerable labour costs.

SUMMARY OF THE INVENTION

The object of the invention is therefore to simplify the production of shell components, in particular the orientation of structural elements such as stringers and/or former segments on the skin panel of the shell component, and to facilitate measurement of a complete section once the individual components, for example in the form of fuselage shells, have been joined together.

This object is achieved by a structural element having the features of claim 1.

Owing to the fact that the structural element comprises at least one positioning aid for position determination using a measuring system, the spatial orientation of a structural element equipped with the positioning aid in relation to a further component, for example a skin panel of a shell component, is simplified considerably. In addition, the absolute precision of the spatial orientation of the structural element in relation to the second component is improved significantly.

A development of the structural element provides that the measuring system is a laser measuring system and/or a tactile measuring system.

Using a laser measuring system makes it possible to obtain a very precise measurement without contact, provided that the distance between the laser measuring system and the structural element according to the invention is not too great.

Using a tactile measuring system makes it possible, in particular, to obtain a more precise measurement in comparison to the conventional laser measuring system in cases where larger components are to be measured. In this case, the positioning aid represents a defined reference point for the tactile measuring system, in order to ensure that exactly the same measuring position is always used when taking a measurement.

A further advantageous development of the structural element provides that the positioning aid can be connected to a target, in particular to a reflector, for determining the position using the laser measuring system.

As a result, the position of a structural aid, which is provided according to the invention with at least one integrally formed positioning aid, in relation to the surrounding space (measuring system) and/or in relation to a further component can be detected very precisely by means of known laser measuring systems. In order to achieve sufficiently precise position information, the distance between the laser measuring system and the component to be measured must not be too great.

A development of the structural element provides that the at least one positioning aid is formed in one piece with the structural element.

As a result of the positioning aid being formed integrally with the structural element, additional measurement errors, which would occur for example if a positioning aid were mounted on the reinforcement profile at a later stage, are eliminated completely.

An advantageous development of the structural element provides that the at least one positioning aid is formed in a spatially defined position on the structural element.

The structural element formed according to the invention may, for example, be produced by the known "RTM method" (Resin Transfer Moulding method). In this case, a preformed reinforcement fibre arrangement is inserted into a two-part mould, for example, and then completely infiltrated with a curable plastics materials, in particular a two-component epoxy resin, with pressure and/or heat being applied. Carbon fibres which preferably extend in a force-flow-optimised manner in a plurality of layers laid one on top of another are generally used as a reinforcement fibre arrangement. The spatial shape of the component to be produced is predetermined very precisely by the mould during the RTM process, but tolerance deviations resulting from shrinkages caused by changes in temperature cannot be ruled out. It is possible to produce the positioning aid according to the invention by any method which uses a mould as a shaping tool. During the production process of the structural element, the positioning aid provided on the structural element may simultaneously be formed in one piece with the remaining structural element—similarly to a flash or a seam in injection moulding technology—for example by means of a small recess or a small indentation in the mould. For this reason, a separate process step is not required to produce the positioning aid. Since, during the production process of the structural element, the positioning aid is already formed simultaneously in a precisely defined spatial position, for example in the region of a central line of a stringer profile, subsequent measurement of the spatial position of the reinforcement profile is simplified and it is also possible to measure the spatial position of the structural element extremely precisely. The precise spatial position of the positioning aid can be determined very precisely on the basis of the known CAD data of the mould.

A further advantageous configuration of the invention provides that the at least one positioning aid can be removed from the structural element in a purely mechanical manner, in particular by grinding, rasping, milling, breaking, cutting or any combination thereof.

As a result, the positioning aid can easily be removed from the structural element after measuring, no as not to negatively affect subsequent production steps. Providing a small predetermined breaking point, for example, makes it still easier to break or shear off the positioning aid and as a result the positioning aid is removed at a defined point. At least three measuring points, i.e. at least three positioning aids, are always required for the correct measurement of a component in three-dimensional space.

A further development of the structural element provides that the laser measuring system is, in particular, a laser tracker.

Using a laser tracker makes it possible to determine an absolute position of a stationary or moving object in space in relation to the location of the laser tracker. For this purpose, a suitable reflector must be arranged on the object to reflect the laser radiation emitted by the laser tracker. The reflector is positioned on the structural element, in particular a stringer, a crossbar or a former segment, in a precisely defined spatial position, which is already predetermined by the construction CAD data and thus known, by means of the positioning aid according to the invention. These known spatial positions are used as setpoint values or as specifications for the measurement of the relative positions of all structural components in relation to one another. By attaching the reflector to the positioning aid, or by arranging it thereon in another way, the spatial position of the structural element can be determined to a level of accuracy of up to $\frac{1}{500}$ mm by means of the laser tracker.

Further advantageous configurations of the structural element are set out in the further claims.

DESCRIPTION OF EXEMPLARY EMBODIMENTS

Figure 1:
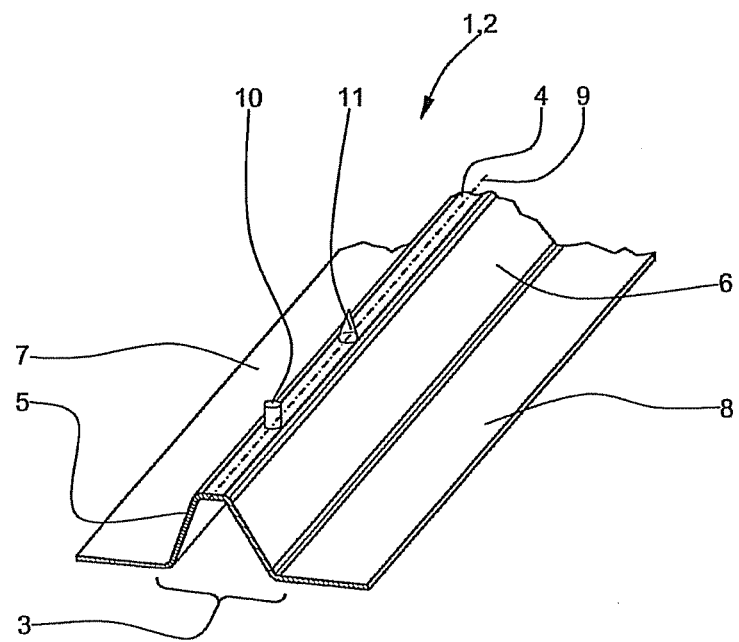
FIG. 1 is a perspective view of an embodiment of a structural element according to the invention.

In the drawings, like constructional elements have the same reference numeral in each case.

FIG. 1 shows a so-called Ω-stringer profile 2 as an embodiment of a structural element 1 according to the invention. The stringer profile 2 has a central portion 3 which has an approximately trapezoidal cross-sectional geometry. The central portion 3 has a horizontal top face 4, which is connected on each side to an inclined side face 5, 6. The side faces 5, 6 each finally transition into a horizontally extending flange 7, 8.

Two positioning aids 10, 11, each having a different geometrical shape, are arranged one behind the other and offset from one another in the region of a central line 9 of the stringer profile 2.

The stringer profile 2 may for example, be produced by means of the RTM process using a carbon-fibre-reinforced epoxy resin. In contrast to the rest of the stringer profile 2, the positioning aids 10, 11 are not fibre-reinforced but preferably consist exclusively of the resin which is also used to produce the resin matrix of the stringer profile 2 for embedding the carbon fibres.

The RTM method is preferably used for formers. Stringer profiles and other structural elements are generally produced in a "hot-forming" process in a mould comprising an upper and a lower mould or by cold forming in a tool of this type. The viscosity of the resin system used to form the structural element is reduced during subsequent autoclaving and in the course of the curing process, in conjunction with corresponding recesses in the moulds and in conjunction with the latent excess resin, this produces the positioning aids in the predetermined positions.

During production of the components, there is generally excess resin in the matrix, which excess resin is used for the integral formation of the positioning aid. The positioning aids 10, 11 are formed during the RTM process. For this purpose, the moulds used simply need to be provided with an indentation, the surface geometry of which corresponds to the desired subsequent shape of the positioning aids 10, 11. In the embodiment shown in FIG. 1, the front positioning aid 10 has the spatial shape of a cylinder, while the rear positioning aid 11 is conical. A reflector can be attached to the positioning aids 10, 11, ideally without clearance, and this reflector, in conjunction with a so-called laser tracker (cf. FIG. 2), makes it possible to measure the position of the stringer profile 2 in relation to a further component (not shown) very precisely. In principle, the positioning aids 10, 11 can have any conceivable surface geometry, provided that the reflector can be applied to the positioning aids 10, 11 without an undercut and, in particular, ideally without clearance. Since the positioning aids 10, 11 are produced using only the resin matrix of the stringer profile 2, after positioning by means of the laser tracker they can be removed from the stringer profile 2 quickly and without leaving any residue, for example by grinding, cutting, scraping, milling, rasping or shearing, in the region of a predetermined breaking point. Deviating from the illustrated arrangement of the positioning aids 10, 11 on the central line 9, these positioning aids 10, 11 may be arranged at any points on the stringer profile 2, namely on the central portion 3, in the region of the side faces 5, 6 and/or in the region of the flanges 7, 8, provided that the precise spatial coordinates of the position of the positioning aids can be determined. These spatial coordinates can generally be derived very precisely from the CAD geometry data of the moulds used to produce the stringer profile 2.

Figure 2:
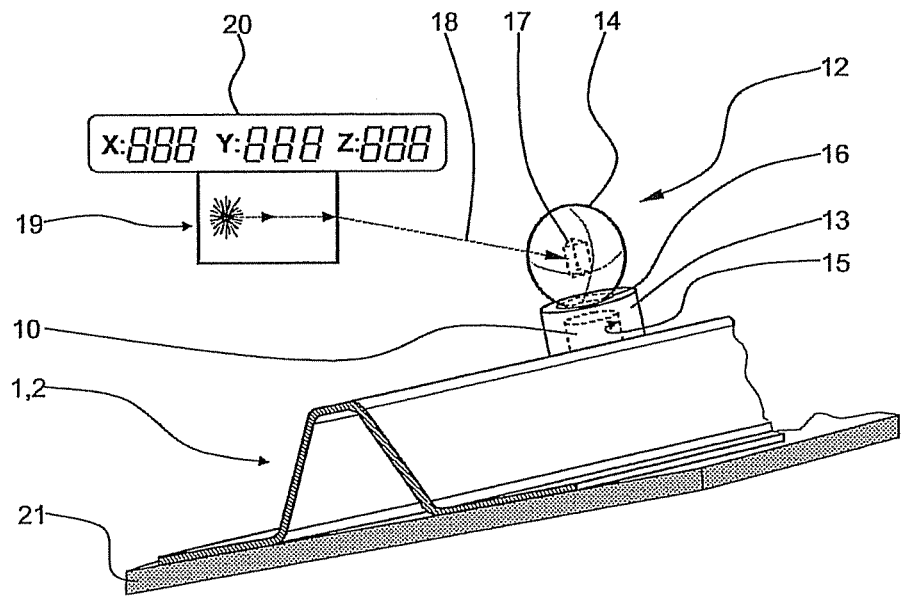
FIG. 2 is an enlarged front view of the structural element of FIG. 1 with a reflector for a laser measuring system attached thereto.

FIG. 2 is an enlarged perspective view of the structural element 1 or the Ω-stringer profile 2 with the cylindrical positioning aid 10 from FIG. 1. A reflector 12 is attached to the positioning aid 10 as a target for a laser measuring system. In addition, the positioning aid 10 can comprise a clamping and/or latching device, in order to ensure that the reflector 12 is firmly secured, even overhead. The clamping and/or latching device makes it possible to release the reflector 12 from the positioning aid 10 once the measurement process is complete. For example, the latching device can be formed by a spring-loaded ball in the region of the positioning aid 10, which ball can be inserted into a correspondingly configured recess of the reflector 12 with a positive fit, at least in regions.

The reflector 12 comprises, inter alia, a holding means 13 comprising a ball 14, the holding means 13 comprising on its lower face a recess 15 which can be attached to the cylindrical positioning aid 10 with a positive fit, at least in regions, or can be connected thereto, in order to produce a temporary, substantially clearance-free, mechanical connection. In addition, the holding device 13 has in the region of an upper face a slightly concave or dome-shaped indentation 16 which is also received in the ball 14, ideally without clearance. Inside the ball 14 there is a prism mirror 17 which interacts with a laser beam 18 emitted by a laser tracker 19 which is used as a laser measuring system.

The reflector 12 or the target for the laser tracker 19—including the components contained therein—involves standard components from measuring technology, which are available for example from Leica-Geosystems®, Faro® or API® Automated Precision Deutschland GmbH.

As a result of the interaction between the laser beam 18 and the prism mirror 17 or the ball 14, the laser tracker 19 is able to determine very precise spatial position information 20 for the prism mirror 17 in the reflector 12 and thus for the stringer profile 2 in this position in relation to the surrounding space and to a component 21. This component 21 may, for example, be a skin panel of a shell component which is to be reinforced by means of the stringer profile 2. The position information 20 may, for example, be provided in Cartesian coordinates to a level of accuracy of up to 1/500 mm. In principle any optical reflector 12, which is adapted for operation with the laser tracker 19, is capable of interacting with the laser tracker 19 to generate the position information 20, and can be attached to the positioning aids 10, 11 without clearance, may be temporarily fastened to the positioning aids 10, 11. In these cases, the holding device 13 (adapter) or the ball 14 is not absolutely necessary. Any structural elements within a fuselage cell structure of an aircraft, for example former segments, crossbars, longitudinal supports, connection angle brackets, support angle brackets, former combs or stabilising angle brackets, may also be provided with the positioning aids 10, 11 according to the invention and subsequently measured. The positioning aids 10, 11 formed on the structural elements in accordance with the invention make it possible to carry out a complete measurement of an entire fuselage section of an aircraft fuselage cell, as a result of which any deviations from predetermined production tolerances can be detected very precisely and with low labour costs. Once the stringer profile 2 has been orientated and the component 21 has subsequently been cured in the autoclave, the component 21 is measured using the positioning device and the reflector 12 is subsequently removed. Since the positioning aids 10, 11 according to the invention can be configured to be very small, they are not likely to damage the vacuum bag or the vacuum film. As described above, the positioning aids 10, 11 may be mechanically removed or may remain on the component for subsequent measuring activities.

The spatial position of the stringer profile 2, which according to the invention is provided with at least one positioning aid 10, 11, in relation to the component 21 can thus be determined in a very precise and reliably reproducible manner. As a result, orientation and positioning of the stringer profile 2 is simplified considerably.

Figure 3:
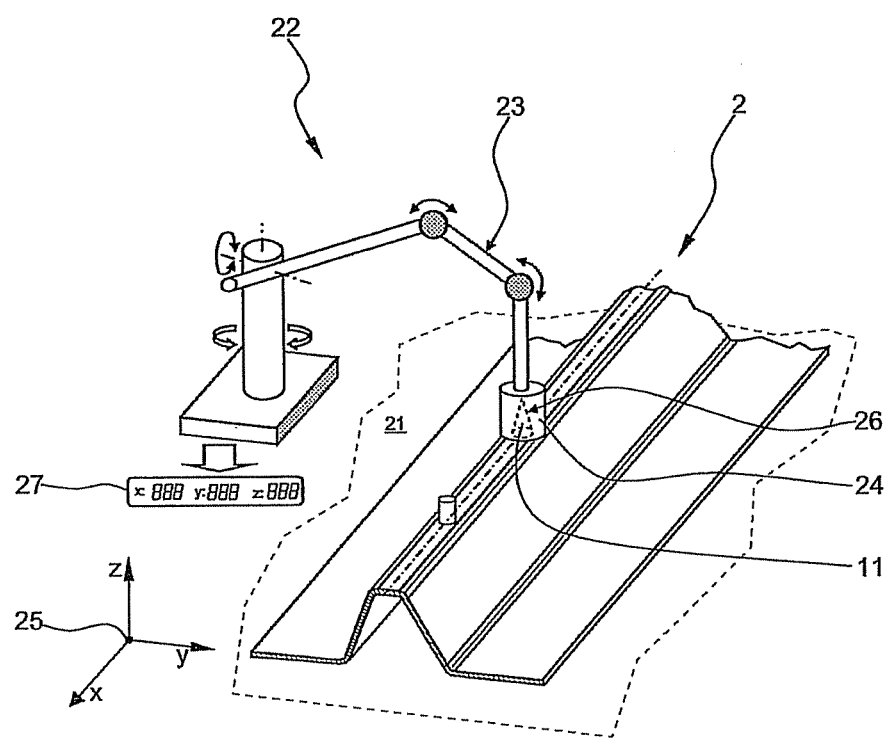
FIG. 3 is a perspective view of the structural element of FIG. 2 located on a component during position detection by means of a tactile measuring system.

FIG. 3 shows the stringer profile 2 according to FIG. 2 arranged on the component 21 during position determination by means of a tactile measuring system (shown in simplified form).

The tactile measuring system 22 has a measuring arm 23 which comprises a measuring adapter 24 arranged on the end of the measuring arm 23. As indicated by the black and white arrows, the measuring adapter 24 can be freely positioned in space, inter alia parallel to the x-axis, y-axis and z-axis of a coordinate system 25. For this purpose, the measuring arm 23 has a plurality of straight arm portions which are articulated to one another. The measuring arm 23 generally has at least six degrees of freedom. Displacement transducers, for example optical rotary encoders (not shown), are located at the articulation points in order to be able to detect very precisely the spatial position of the measuring adapter 24 in relation to the coordinate system 25.

For determining the relative position of the Ω-stringer profile 2 in relation to the coordinate system 25 and thus also in relation to the component 21, the adapter 24 is orientated in space by means of the measuring arm 23 in such a way that the measuring adapter 24 is brought into a positive fit, at least in regions, with the conical rear positioning aid 11 formed on the Ω-stringer profile 2. For this purpose, the cylindrical measuring adapter 24 has on a lower face a hollow-cone-shaped recess 26, which is configured to correspond (with a positive fit at least in regions) to the conical surface geometry of the positioning aid 11. Alternatively, the cylindrical front positioning aid 10 can also be used, provided that the measuring adapter 24 has on its lower face a correspondingly formed recess, which makes it possible temporarily to connect the positioning aid and the measuring adapter 24 with a positive fit, at least in regions.

The spatial position of the measuring adapter 24 which is determined in this way is detected very precisely within the tactile measuring system by the displacement transducer, digitised and then converted into position information 27. The position information 27 gives the relative position of the Ω-stringer profile 2 in relation to the coordinate system 25 in suitable coordinates, for example in Cartesian, cylindrical or polar coordinates.

In contrast to a laser measuring system, in particular a laser tracker, the tactile measuring system 22 does not enable contactless measurement. However, it does provide significantly improved measurement accuracy in the case of larger distances from the test object and/or large test objects, since the measurement inaccuracy of a laser tracker increases significantly as the distance between the laser tracker and the reflector increases. When the distance between the laser tracker and the reflector is, for example, 30 m, it is generally only possible to achieve measurement accuracy in the order of approximately 0.1 mm using a laser tracker.

Instead of the tactile measuring system 22 which is shown by way of example in FIG. 3 and comprises a measuring arm 23 having a plurality of degrees of freedom for guiding the measuring adapter 24, the measuring adapter 24 can also be guided on a gantry arrangement above the components to be measured, in order in particular to reduce measurement inaccuracy in the case of large components. The gantry arrangement can be displaceably mounted on two rails which extend parallel to one another and are arranged on either side of the components to be measured.

LIST OF REFERENCE NUMERALS

| | | |
|---|---|---|
| 1 | structural element | |
| 2 | Ω-stringer profile | |
| 3 | central portion | |
| 4 | top face | |
| 5 | side face | |
| 6 | side face | } Ω-stringer profile |
| 7 | flange | |
| 8 | flange | |
| 9 | central line | |
| 10 | positioning aid | |
| 11 | positioning aid | |
| 12 | reflector | |

-continued

| | |
|---|---|
| 13 | holding means |
| 14 | ball |
| 15 | recess |
| 16 | indentation |
| 17 | prism mirror |
| 18 | laser beam |
| 19 | laser tracker |
| 20 | position information (Ω-stringer profile) |
| 21 | component |
| 22 | tactile measuring system |
| 23 | measuring arm |
| 24 | measuring adapter |
| 25 | coordinate system |
| 26 | recess (measuring adapter) |
| 27 | position information (Ω-stringer profile) |

The invention claimed is:

1. A structural element for a fuselage cell structure of an aircraft, the structural element being made from a composite material, and the structural element comprising at least one positioning aid for position determination using a measuring system, wherein the at least one positioning aid is formed with a predetermined surface geometry on the structural element configured for attachment of a target or adapter of the measuring system to provide a discrete measurement point, wherein the at least one positioning aid is formed as an integral part of the structural element.

2. The structural element according to claim 1, wherein the measuring system is a laser measuring system and/or a tactile measuring system.

3. The structural element according to claim 1, wherein the positioning aid can be connected to a target for position determination using the laser measuring system.

4. The structural element according to claim 1, wherein the at least one positioning aid is formed in a spatially defined position on the structural element.

5. The structural element according to claim 1, wherein the at least one positioning aid can be removed from the structural element mechanically by grinding, rasping, milling, breaking, cutting or any combination thereof.

6. The structural element according to claim 1, wherein the laser measuring system is, in particular, a laser tracker.

7. The structural element according to claim 1, wherein the shape of the positioning aid(s) is such that it is possible for a reflector, as a target, to be attached with a positive fit, at least in regions, and substantially without clearance.

8. The structural element according to claim 7, wherein the at least one positioning aid is, in particular, cylindrical, conical, pyramidal or frustum-shaped and is made from a matrix material of the structural element.

9. The structural element according to claim 1, wherein the target is a reflector or a mirror, which is received in a holding means, it being possible to attach the holding means to the positioning aid with a positive fit, at least in regions.

10. The structural element according to claim 1, wherein a spatial position between the structural element and a further component, in particular a shell segment and/or a coordinate system of a three-dimensional space, can be determined by means of the laser measuring system.

11. The structural element according to claim 1, wherein the structural element is a stringer profile or an annular former segment.

12. The structural element according to claim 1, wherein the structural element is made from a carbon-fibre-reinforced epoxy resin.

13. The structural element according to claim 8, wherein the at least one positioning aid is made from an epoxy resin.

14. The structural element according to claim 9, wherein the target is a prism mirror.

15. A structural element for a fuselage cell structure, wherein the structural element is formed from a composite material and comprises at least one positioning aid for position determination using a measuring system, wherein the at least one positioning aid is integrally formed on the structural element with a predetermined surface geometry configured for attachment of a target or adapter of the measuring system to provide a discrete measurement point for the measuring system.

16. The structural element according to claim 15, wherein the measuring system is a laser measuring system or a tactile measuring system.

17. The structural element according to claim 15, wherein the positioning aid is configured for attachment of a target for position determination via a laser measuring system.

18. The structural element according to claim 15, wherein the at least one positioning aid is formed in a spatially defined position on the structural element.

19. The structural element according to claim 15, wherein the at least one positioning aid is mechanically removable from the structural element by grinding, rasping, milling, breaking, cutting or any combination thereof.

20. The structural element according to claim 15, wherein the predetermined surface geometry of the at least one positioning aid is such that the target or adapter of the measuring system is configured to be attached with a positive fit and substantially without clearance.

21. The structural element according to claim 15, wherein the at least one positioning aid is made from a matrix material of the structural element.

22. The structural element according to claim 15, wherein the structural element is a stringer profile or an annular former segment.

* * * * *